United States Patent Office 3,618,188
Patented Nov. 9, 1971

3,618,188
CLAMPING MEANS FOR AN INSERT IN A TOOL HOLDER
Kurt Heinrich Albert Erich Faber, Sandviken, Sweden, assignor to Sandvikens Jernverks Aktiebolag, Sandviken, Sweden
Filed Nov. 28, 1969, Ser. No. 880,567
Claims priority, application Sweden, Nov. 29, 1968, 16,286/68
Int. Cl. B26d 1/00
U.S. Cl. 29—96
9 Claims

ABSTRACT OF THE DISCLOSURE

An insert is clamped in a tool holder by means of a pin rotatable in an aperture in the tool holder, which pin is, in part, eccentric with respect to the aperture and can be brought into contact with a fixed abutment so as to exert a lever action against the cutting insert.

---

The present invention relates to a tool holder with an insert fastened by clamping, the clamping being performed by means of a pin that enters into an aperture in the insert. The invention represents a simplification of the construction and of manipulation as compared with previous tool holders of this general kind.

The invention will now be specifically described, with reference to the accompanying drawing, in which FIG. 1 is a section, taken on line 1—1 in FIG. 3, of a tool holder according to the invention;

Figure 1:
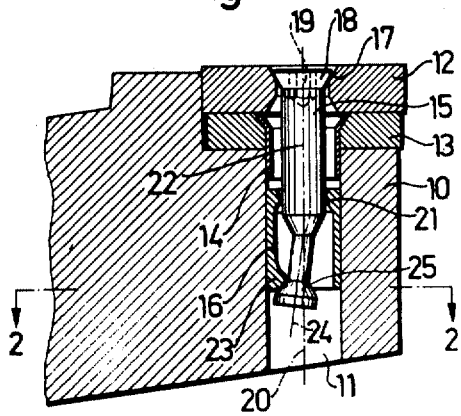

The tool holder 10 shown in FIG. 1 has an insert site with an adjoining bore 11. In the tubular site are mounted a shim plate 13, attached with a tubular pin 14, and a cutting insert 12. The insert is clamped by means of a clamping pin 15, which is rotatably mounted in the bore 11. When in place, the lower part of pin 15 is surrounded by a bushing 16, fastened in the bore. The upper part of pin 15 passes through the insert 12 at a bore 17 therethrough, and the upper end of the pin is formed with a conical, upwardly widening, portion 18 which is complementary to a correspondingly formed seat in the bore of the insert. The pin also has a polygonal key grip 19 for turning and clamping.

The upper part of bushing 16 has a ridge 21 which is concentric with the axis 20 of bore 11 and which surrounds pin 15. The axis 22 of the upper part of the pin coincides with the axis 20 of the bore. The lower part of bushing 16 has an eccentric ridge 23 which cooperates with the lower part of pin 15. This lower part of the pin has an axial direction 24 which forms an angle with the upper axis 22. In this way, when the pin is turned its lower end rotates around the axis 20.

The lowermost part of the pin is formed as a cone 25, which cone obliquely abuts from below against the ridge 23 when the pin is turned to the position shown in FIG. 1. In this position the cutting insert is clamped in contact with the inner edges 26 and 27 of the insert site and with shim plate 13. The portion 25 should be inclined so that an effective locking in obtained.

Figure 2:
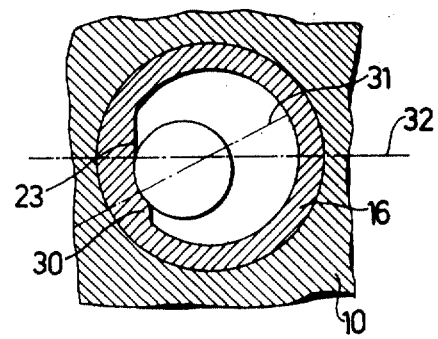
FIG. 2 is a section on line 2—2 in FIG. 1, on an enlarged scale.
Figure 3:
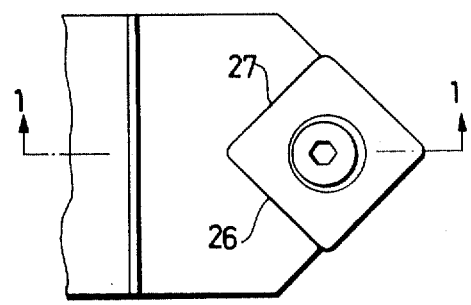
FIG. 3 is an elevational top view of the tool holder shown sectionally in FIG. 1.

In order to prevent the pin from loosening because of vibrations, the ridge 23 is provided with an abutment 30 shown in FIG. 2. The maximum clamping force of the pin is obtained when the diameter 31 of the maximum eccentricity of the pin coincides with the diameter 32 of the maximum eccentricity of the ridge 23. The abutment 30 is so placed that the pin must be turned somewhat past the point of maximum tension before it meets said abutment. In this way undesired loosening of the pin is prevented.

Figure 4:
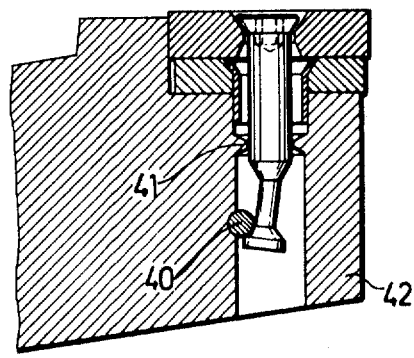
FIG. 4 is a section, on line 4—4 in FIG. 5; and of another embodiment of a tool holder according to the invention.
Figure 5:
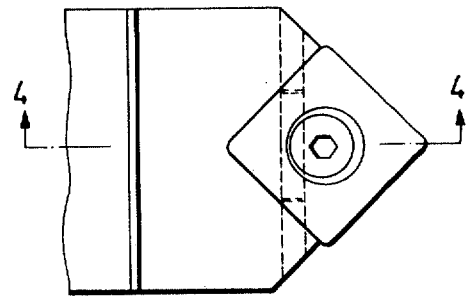
FIG. 5 is an elevational top view of the tool holder shown in FIG. 4.

The embodiment shown in FIGS. 4 and 5 is similar to the above-described embodiment: it differs therefrom only in that the bushing 16 is missing and in that the ridge 23 has been replaced by a pin 40 which is countersunk in the tool holder. Instead of the upper ridge 21 in the bushing there is a ridge 41 in the holder 42.

As can be seen from the specification, locking of the cutting insert is obtained by turning the pin until an eccentric portion on it is in contact with a fixed abutment on the holder. In this way the pin acts as a double-armed lever with its fulcrum at its middle portion against the ridge 21 and 41 respectively, the upper part of the pin urging the cutting insert against the side surfaces of the insert site. At the same time the inclination of the conical surface 25 causes a downward traction in the pin, so that the head 18 of the pin is urged against the conical surface in the bore 17 of the insert. In this manner, the insert is urged downwardly and from the wedging action between the parts 17 and 18 the lateral pressure is increased.

The described clamping device is not only simple in its construction but it also permits a fast clamping. It is only necessary to turn the pin less than one turn in order to clamp the cutting insert.

I claim:

1. Means for clamping a cutting insert in an insert site in a tool holder of the type wherein the cutting insert is provided with an opening registerable with a bore in the tool holder at the insert site, which comprises an eccentric pin insertable through said opening and into said bore, said eccentric pin being formed as a double-armed lever having a support at a central portion and an eccentric lower part, which lower part is brought into a clamping contact with a fixed abutment within the bore when the pin is turned in said bore and by lever action urges the upper part of the pin sideways, so that the cutting insert is urged against side surfaces of the bore in said insert site.

2. Means defined in claim 1, and in which the lower part of the pin is conical and in which a portion of the bore is ridged complementarily to said conical part, so that a downwardly pulling force in the pin is obtained when the pin is turned.

3. Means as defined in claim 2, in which the upper part of the pin has a downwardly tapering projection cooperating with a complementary seat in the insert, the pin when turned urges the insert against a bottom surface of said insert site.

4. Means as defined in claim 1, in which said bore is provided with an abutment against which said pin abuts when being turned somewhat after the turning position for maximum tension has been passed.

5. A cutting tool consisting of a tool holder having an insert site with a bottom surface and side surfaces, a bore extending into said tool holder from said site, a cutting insert replaceably securable against said bottom surface of said insert site;
an aperture in said insert registerable with said bore;
a fixed abutment within said bore;
a pin insertable through said aperture and into said bore;
the lower part of said pin being eccentric with respect to its upper part and being rotatable in said bore into clamping contact with said abutment whereby said insert is clampingly pressed against side surfaces of said insert site.

6. Tool holder with an insert site and a bore adjoining said site in which bore a pin is journalled that protrudes from the insert site and is arranged to enter into a hole in an insert in the site, the protruding part of the pin being arranged to move sideways when the pin is turned thus clamping the insert against a side abutment in the holder, characterized in that the bore (11), that surrounds the pin, along a short portion (21, 41) of its length has substantially the same diameter as the pin but for the rest has a larger diameter than the pin, so that the pin can be somewhat inclined to different angular positions with the said short portion as center, the pin having below said short portion a protrusion (25) that is eccentric in relation to the upper part of the pin and is arranged to abut in a certain turning position against a protrusion (23, 40) on the holder, so that the lower part of the pin is urged sideways, the pin acting as a two-armed lever with the short portion (21) of the bore as a fulcrum, so that the upper part of the pin urges the insert against the side abutment (26, 27).

7. Tool holder as defined in claim 6, further characterized in that the eccentric protrusion (25) on the pin and the protrusion (23) cooperating therewith on the holder are so inclined that they by a wedging action cause a downwardly pulling force in the pin, at the same time as the part of the pin that enters into the insert has a head (18) which engages a corresponding seat (17) in the seat, so that the pin urges the insert downwardly against the bottom surface of the insert site.

8. Tool holder as defined in claim 6, characterized in that an additional abutment (30) is arranged to stop the turning of the pin soon after the position of maximum clamping tension has been reached.

9. Tool holder as defined in claim 7, in which the head (18) of the pin and its seat (17) in the insert have contact surfaces so formed that the insert, at the same time as it is urged downwardly, also is urged sideways against the side abutment by a wedging action.

References Cited
UNITED STATES PATENTS

| | | | |
|---|---|---|---|
| 3,137,059 | 6/1964 | Hertel | 29—96 |
| 3,142,110 | 7/1964 | Hertel | 29—96 |
| 3,146,656 | 9/1964 | Richards | 29—96 X |
| 3,354,526 | 11/1967 | Erkfritz | 29—96 |
| 3,488,822 | 1/1970 | Jones | 29—96 |
| 3,490,117 | 1/1970 | Hertel | 29—96 |
| 3,491,421 | 1/1970 | Holloway | 29—96 |
| 3,525,136 | 8/1970 | Crosby | 29—96 |

HARRISON L. HINSON, Primary Examiner